(12) United States Patent
Burton (10) Patent No.: US 11,878,212 B2
(45) Date of Patent: Jan. 23, 2024

(54) MARTIAL ARTS TRAINING SYSTEM

(71) Applicant: Patrick Louis Burton, Youngsville, NC (US)

(72) Inventor: Patrick Louis Burton, Youngsville, NC (US)

(*) Notice: Subject to any disclaimer, the term of this patent is extended or adjusted under 35 U.S.C. 154(b) by 420 days.

(21) Appl. No.: 16/869,657

(22) Filed: May 8, 2020

(65) Prior Publication Data
US 2020/0353337 A1 Nov. 12, 2020

Related U.S. Application Data

(60) Provisional application No. 62/845,866, filed on May 9, 2019.

(51) Int. Cl.
*A63B 24/00* (2006.01)
*A63B 71/06* (2006.01)
(Continued)

(52) U.S. Cl.
CPC ...... *A63B 24/0003* (2013.01); *A63B 24/0075* (2013.01); *A63B 71/0622* (2013.01); *G02B 27/0172* (2013.01); *G06F 1/163* (2013.01); *G06F 3/014* (2013.01); *G09B 5/14* (2013.01); *G09B 19/003* (2013.01); *A63B 2024/0009* (2013.01); *A63B 2024/0081* (2013.01);
(Continued)

(58) Field of Classification Search
CPC .............. A63B 69/004; A63B 24/0075; A63B 71/0622; A63B 2024/0009; A63B 2024/0081; A63B 2071/0638; A63B 2071/0666; G02B 27/0172; G02B 2027/0178; G06F 1/163; G06F 3/014; G09B 5/14; G09B 19/003
See application file for complete search history.

(56) References Cited

U.S. PATENT DOCUMENTS

| 2012/0242678 A1* | 9/2012 | Border | G02B 27/0093 345/589 |
| 2013/0225305 A1* | 8/2013 | Yang | H04N 13/30 463/32 |

(Continued)

FOREIGN PATENT DOCUMENTS

| AU | WO2017127571 | * 8/2018 | ........ A61B 1/00 |
| WO | WO-2015084839 A1 * 6/2015 | ........ A43B 3/0005 |

OTHER PUBLICATIONS

Omron ("Displacement Sensors Measurement Sensors", 2018, https://www.ia.omron.com/support/guide/56/introduction.html) (Year: 2018).*

*Primary Examiner* — Xin Sheng
(74) *Attorney, Agent, or Firm* — Brennan, Manna & Diamond, LLC (57) ABSTRACT

A martial arts training system and method of using the same. The martial arts training system comprises an eyewear component and a user interface. The user interface is operatively connected to the eyewear component and may be integrated into the eyewear component or into a wearable article having proximity sensors. The wearable article may be a belt, gloves, footwear, or a combination thereof. The martial arts training system provides martial arts training programs that are viewable via the eyewear component in real-time or from a library database while allowing an instructor to provide feedback remotely.

4 Claims, 6 Drawing Sheets

(51) Int. Cl.
  *G02B 27/01* (2006.01)
  *G06F 3/01* (2006.01)
  *G06F 1/16* (2006.01)
  *G09B 5/14* (2006.01)
  *G09B 19/00* (2006.01)
(52) U.S. Cl.
  CPC ............... *A63B 2071/0638* (2013.01); *A63B 2071/0666* (2013.01); *A63B 2244/10* (2013.01); *G02B 2027/0178* (2013.01)

(56) References Cited

U.S. PATENT DOCUMENTS

| | | | |
|---|---|---|---|
| 2018/0256962 A1* | 9/2018 | Kudirka | A63B 71/0669 |
| 2018/0260024 A1* | 9/2018 | Maltz | G02B 27/017 |
| 2019/0091535 A1* | 3/2019 | DeCarlo | A63B 69/00 |
| 2019/0122410 A1* | 4/2019 | Chamdani | G16H 20/30 |
| 2021/0093916 A1* | 4/2021 | Lowe | A63C 1/30 |
| 2022/0222881 A1* | 7/2022 | Nakade | G10H 1/40 |

\* cited by examiner

MARTIAL ARTS TRAINING SYSTEM

CROSS-REFERENCE

This application claims priority from Provisional Patent Application Ser. No. 62/845,866 filed on May 9, 2019.

BACKGROUND

The martial arts are a variety of fighting sports or skills, mainly of East Asian Origin. They are typically divided into armed and unarmed sports. The term refers to all of the various systems of training for combat that have been arranged or systematized. The general purpose is to teach individuals how to physically defeat opponents and defend against physical threats. There are a wide variety of martial arts, including, but not limited to, Karate, Taekwondo, Jiu Jitsu, mixed martial arts (MMA), Aikido, Hapkido, Judo, Kung Fu, Tai Chi, and the like.

Martial arts have achieved a wide popularity throughout the United Stated along with the rest of the world. This type of training can teach discipline, self-defense, and be used as a fitness program for people of all ages, conditions, and ability. Martial arts practice has been shown to improve cardiovascular fitness, muscle strength, coordination, posture, stamina, endurance, and flexibility. Additionally, martial arts are often used to teach mental discipline and relaxation as they have mental benefits. Martial arts like Taekwondo are increasingly understood as a comprehensive approach to both physical and mental well-being. The unique combination of strenuous mental and physical training helps individuals perform better in many aspects of their lives.

Currently, martial arts students are subject to growth stagnation as a result of missing physical classes. If students fail to show progression, their parents may question the validity of the class and withdraw the children. This hurts both the students and the instructors. Additionally, it can be difficult for even the most talented and gifted instructors to instruct every student in their class to the fullest. However, if a student's incorrect movements are not corrected immediately, they can easily become bad habits ingrained in muscle memory. Further, students may wish to learn from instructors beyond their geographical boarder, which is currently impossible.

Accordingly, there is a great need for a uniquely designed to provide access to martial arts training 24 hours a day. Advantageously, the present invention allows traditional martial arts teachers to teach beyond their physical barriers, which can limit students' capacity to learn. The invention encourages continual growth and progress in the martial arts without restrictions. Instructors will now be able to assess a student's every punch, kick, and movement in real time and provides for on-the-spot corrections. It allows parents and students to seek out the best instructors and the best fits, which can motivate instructors to improve their teaching techniques. The invention includes a way for students to practice at their convenience at any time of the day so that they do not have to rely on scheduled classes or appointments.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a martial arts training system. The martial arts training program comprises a user interface, a network, and a server. The user interface comprises at least one processor and a network interface. The user interface may further comprise a memory and a power supply. The server comprises a server processor and a server memory. The server memory comprises a non-transitory, computer-readable medium comprising a set of executable software instructions. When the set of executable software instructions are executed by the server processor, the set of executable software instructions cause the server processor to execute a martial arts training program that is accessible by the user interface.

The server memory may further comprise a database of saved martial arts training programs. The saved martial arts training programs are accessible by the user interface remotely. The server is also useable to connect an instructor with a student for live training in real-time. The server further comprises a feedback mechanism so that the instructor can provide feedback to the student in real-time.

The martial arts training program further comprises an eyewear component. The eyewear component comprises a display for allowing the student to view the martial arts training programs. The user interface may be integrated into or be otherwise remotely connected to and in communication with the eyewear component. The martial arts training system may further comprise at least one wearable component. The at least one wearable component may be a belt, a pair of gloves, a pair of footwear, or a combination thereof. The user interface may be integrated into or be otherwise connected to and in communication with the at least one wearable component as well as the eyewear component. The eyewear component and the at least one wearable component may each further comprise a plurality of proximity sensors for providing feedback to the instructor via the feedback component. The instructor may then correct the student in real-time based on the received feedback from the proximity sensors.

An additional embodiment of the present invention comprises a method of using the martial arts training system. The martial arts training system is used to connect a student to an instructor or a database of stored martial arts training programs. The student selects and then performs the martial arts training program using the user interface and viewing the martial arts training program via the eyewear component. The instructor receives feed back from the proximity sensors about the student's performance and provides feedback in real-time to correct the performance.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION OF THE INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a unique system for connecting martial arts instructors with students for teachings in real-time, as well as a library of recorded teachings for continual and impactful growth. The innovative system features a martial arts augmented reality system that connects instructors and students for virtual training. The system includes high-tech eyewear that can receive three-dimensional (3D) images from the instructor's location and display it remotely to the student wearing the eyewear. Classes may be saved in a database for future access and reference.

A belt can be equipped with replaceable proximity sensors, memory cards, a power supply, a CPU, and input/output ports to send and receive data from each student. The system can also receive and send data, images, and sound in real-time or delayed by way of stored data. Additionally, the movements of the hands, feet, waist, and head can be transmitted in real-time via replaceable proximity sensors in wearable articles, such that instructors can critique students expeditiously. The system may also have the capability of showing virtual parameters for the adjustments of incorrect movements or minor corrections. The system can calculate the height, arm length, leg distance, and foot distance, allowing it to know approximately how high each student should be kicking, punching, and so forth.

Referring initially to FIGS. 1-5, a martial arts training system 100 is described. The martial arts training system 100 connects students to instructors remotely for individual personalized training at the student's convenience. The martial arts training system 100 may be a live, stored, augmented or virtual reality martial arts training system. The martial arts training system 100 comprises an eyewear component 132 and a user interface 102 operatively connected to the eyewear component 132.

Figure 1:
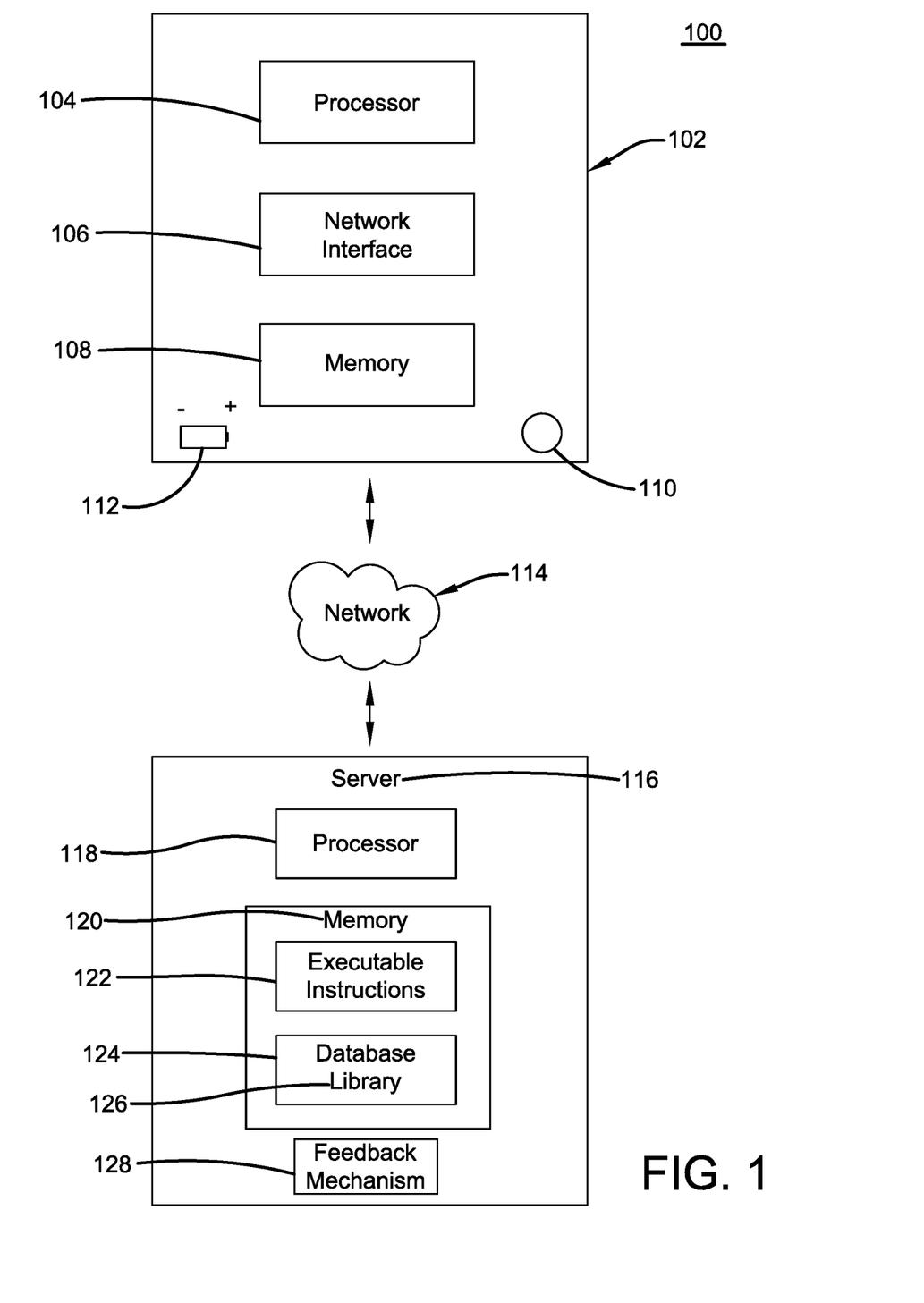
FIG. 1 illustrates a schematic diagram of a computer environment for practicing aspects of a martial arts training system in accordance with the disclosed architecture.

As illustrated in FIG. 1, the user interface 102 is controlled by the instructor (but could also be controlled by the student if the instructor isn't available) comprises at least one processor 104, a network interface 106, and a power supply 112, such as a battery. The user interface 102 may further comprises a local memory 108 and an input/output 110. The local memory 108 is typically a memory card comprising a non-transitory computer-readable medium comprising a set of software instructions. The at least one processor 104 is configured to execute the software instructions that are stored in the local memory 108 or that are received remotely as described infra. The set of software instructions allows the eyewear component 132 to perform methods of the present technology when executed by the at least one processor 104. The user interface 102 may be integrated into the eyewear component 132 or connected to the eyewear component 132 wirelessly as described infra.

The martial arts training system 100 further comprises a server 116 comprising a server processor 118 and a server memory 120. The server memory 120 comprises a non-transitory, computer-readable medium comprising a set of executable software instructions 122. When the set of executable software instructions 122 are executed by the server processor 118, the set of executable software instructions 122 cause the server processor 118 to execute a martial arts training program that is remotely accessible by the user interface 102 and viewable via the eyewear component 132.

The server memory 120 may further comprise a database 124 for storing a plurality of training programs 126. The database 124 is accessible by a martial arts instructor to upload and store training classes and programs that are then accessible to a student via the user interface 102. The instructor is also capable of using the server 116 to send and interact with a student and teach a martial arts training program in real-time via a camera at the instructor site and the eyewear component 132 at the user site. More specifically, the martial arts training program is viewable by the student in real-time via the eyewear component 132.

A network 114 connects the user interface 102 to the server 116. The network 114 may be any of a number of private or public communications mechanisms such as the Internet, a local intranet, a Personal Area Network, a Local Area Network, a Wide Area Network, a Virtual Private Network, or the like. When the user interface 102 is connected to the server 116 via the network 114, the set of executable software instructions 122 allows the server 116 to perform methods of the present technology when executed by the server processor 118.

The server 116 further comprises a feedback mechanism 128. The feedback mechanism 128 allows the instructor to receive data from the martial arts training system 100 and to correct a martial arts move, such as a punch, kick, or movement in real-time. The feedback mechanism 128 is accessible by the user interface 102 for receiving the feedback from the remote instructor.

Figure 2A:
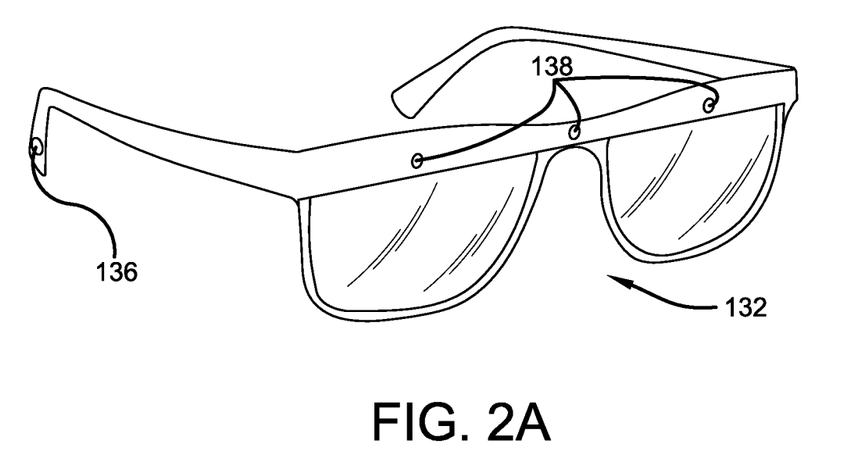
FIG. 2A illustrates a perspective view of an eyewear component of the martial arts training system in accordance with the disclosed architecture.
Figure 2B:
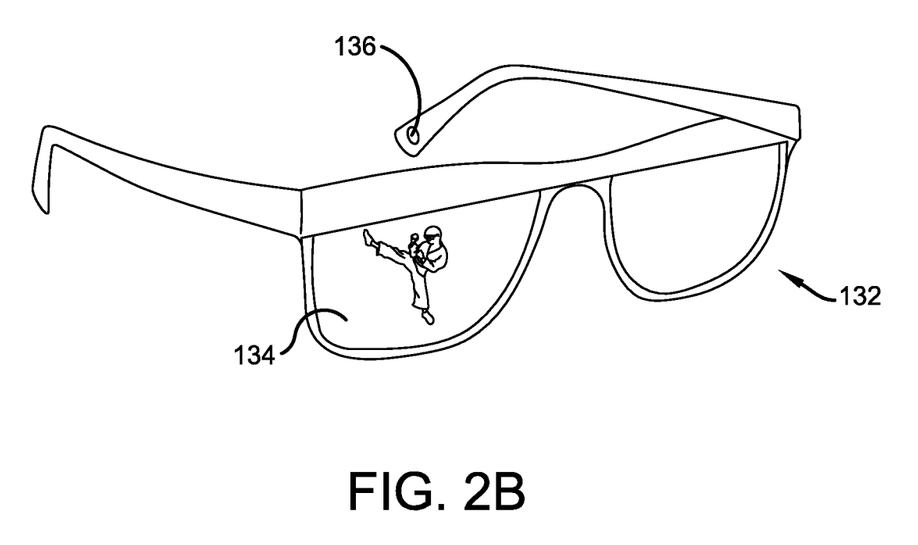
FIG. 2B illustrates a perspective view of the eyewear component of the martial arts training system in accordance with the disclosed architecture.

As illustrated in FIGS. 2A and 2B, the eyewear component 132 comprises a display 134. The eyewear component 132 is configured to receive and display three-dimensional images. This allows the student to view and interact with the martial arts training program on the display 134 of the eyewear component 132. The user interface 102 is operatively connected to the eyewear component 132. The user interface 102 may be integrated directly into the eyewear component 132 or alternatively may be electrically or wirelessly connected via a user interface connection 132 integrated into the eyewear component 132.

Figure 5:
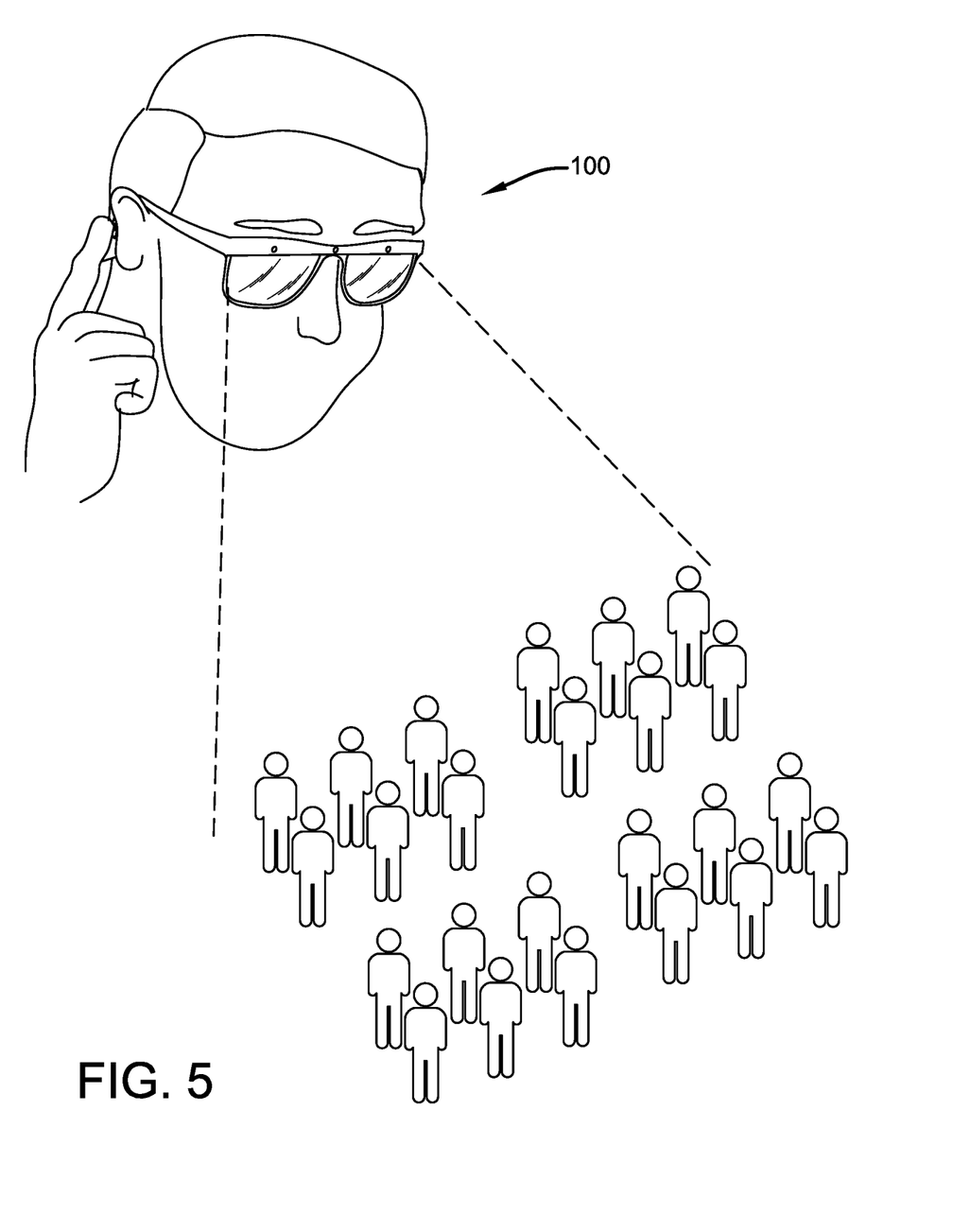
FIG. 5 illustrates an instructor remotely accessing a plurality of students using the martial arts training system in accordance with the disclosed architecture.

The eyewear component 132 may further comprise at least one sensor 138. The at least one sensor 138 is typically a proximity sensor configured to measure or calculate the height, length, distance, or form of a martial arts move. Data from the at least one sensor 138 is then transmitted via the at least one processor 104 of the user interface 102 through the network 114 to the instructor. The instructor may then provide the feedback via the feedback mechanism 128 to correct the martial arts move as illustrated in FIG. 5. The feedback may be virtual or by video. The user interface 102 receives and sends images, data, and sound in real-time.

Figure 3A:
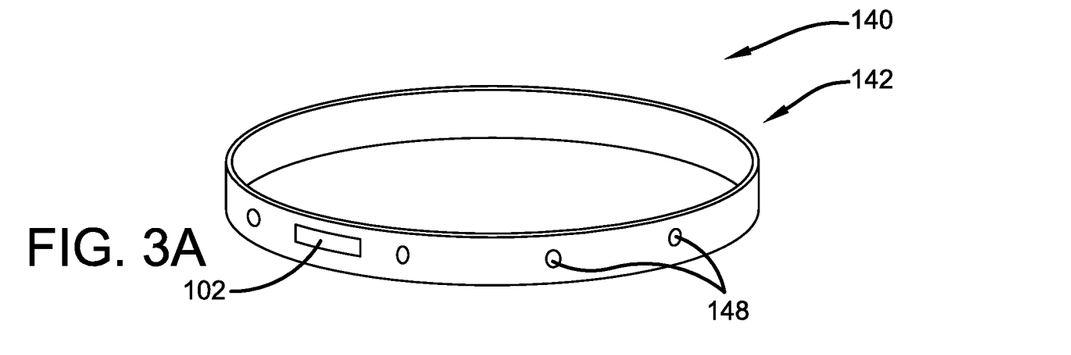
FIG. 3A illustrates a perspective view of a belt of at least one wearable component of the martial arts training system in accordance with the disclosed architecture.
Figure 3B:
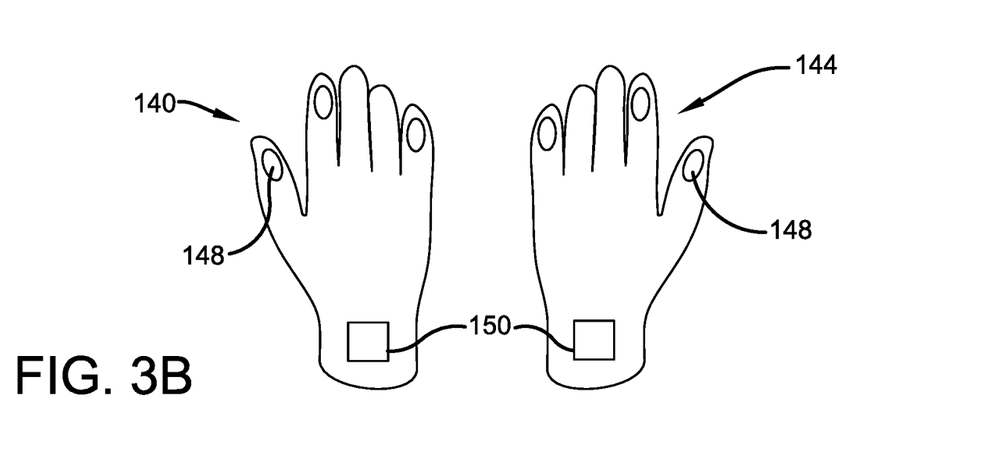
FIG. 3B illustrates a perspective view of a pair of gloves of the at least one wearable component of the martial arts training system in accordance with the disclosed architecture.
Figure 3C:
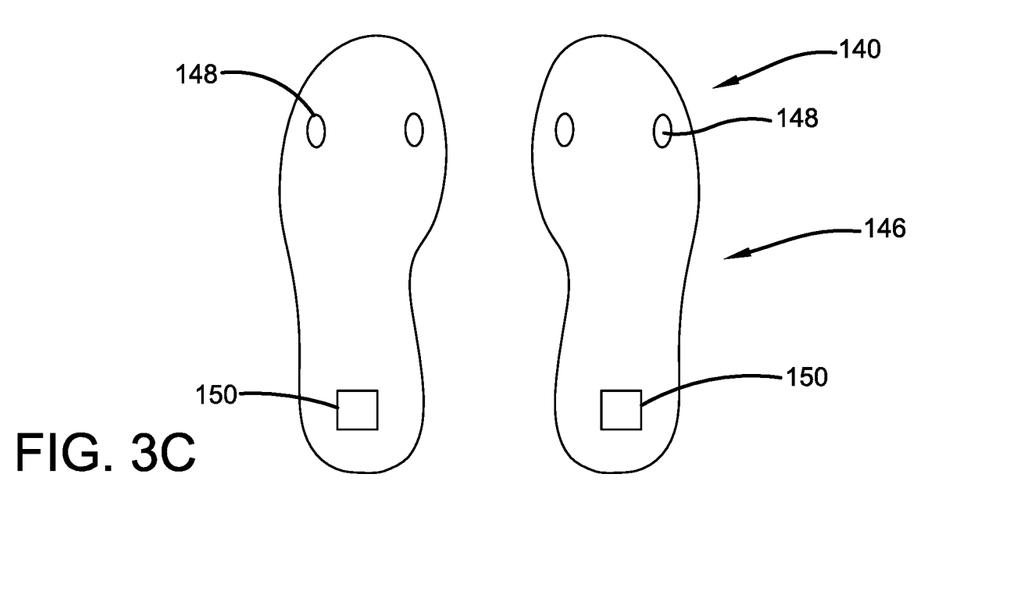
FIG. 3C illustrates a perspective view of a pair of footwear of the at least one wearable component of the martial arts training system in accordance with the disclosed architecture.
Figure 4:
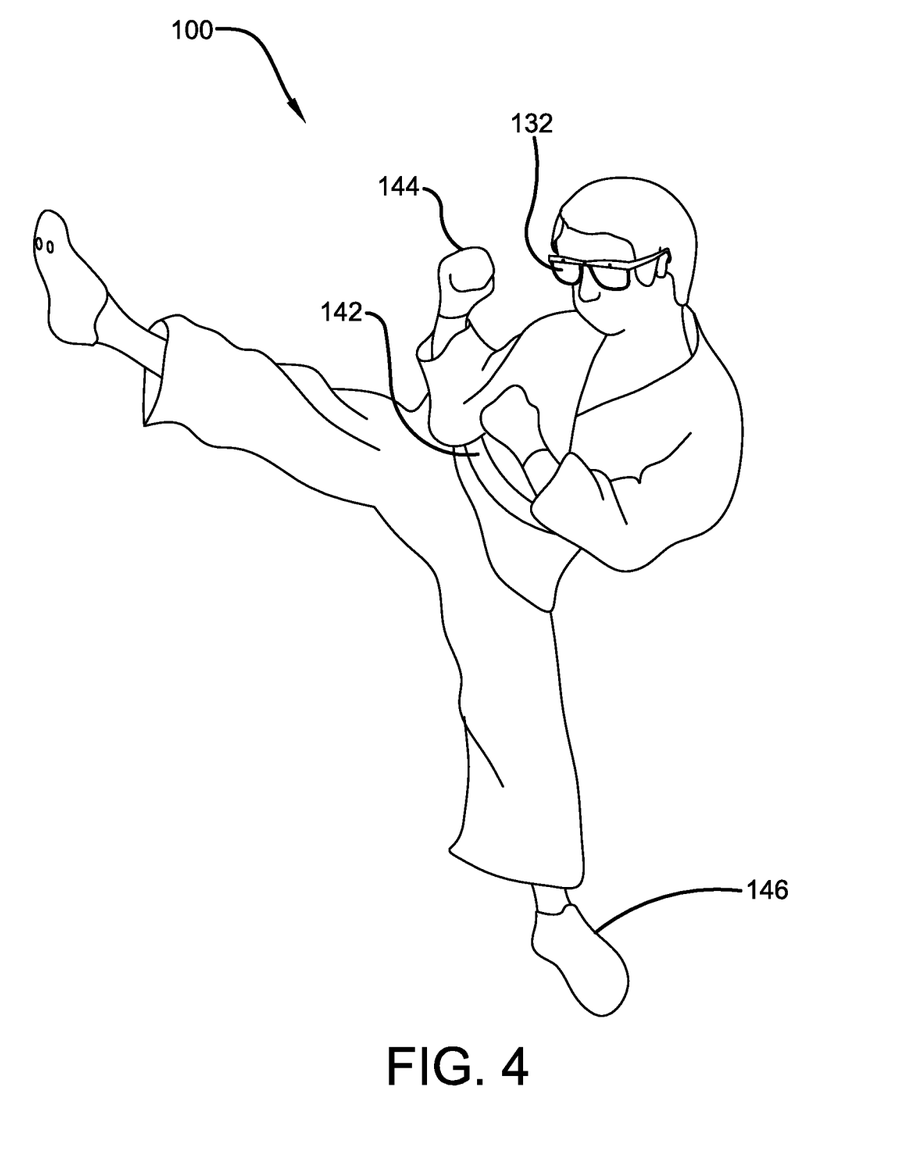
FIG. 4 illustrates a user wearing a plurality of the at least one wearable component of the martial arts training system in accordance with the disclosed architecture.

As illustrated in FIGS. 3A-4, the martial arts training system 100 may further comprise at least one wearable component 140. The at least one wearable component 140 comprises at least one sensor 148. The at least one sensor 148 is typically a proximity sensor configured to measure or calculate the height, length, distance, of form of a martial arts move. Data from the at least one sensor 138 is then transmitted via the at least one processor 104 of the user interface 102 through the network 114 to the instructor.

The user interface 102 is operatively connected to the at least one wearable component 130. The user interface 102 may be integrated directly into the at least one wearable component 130 or may be electrically or wirelessly connected via a user interface connection 150 integrated into the at least one wearable component 130. The at least one wearable component 130 may be a belt 142, a pair of gloves 144, a pair of footwear 146, or a combination thereof as illustrated in FIG. 4. The at least one sensor 148 may then be a plurality of proximity sensors embedded or otherwise integrated into each of the belt 142, the pair of gloves 144, the pair of footwear 146 for providing additional data for each martial arts move.

Figure 6:
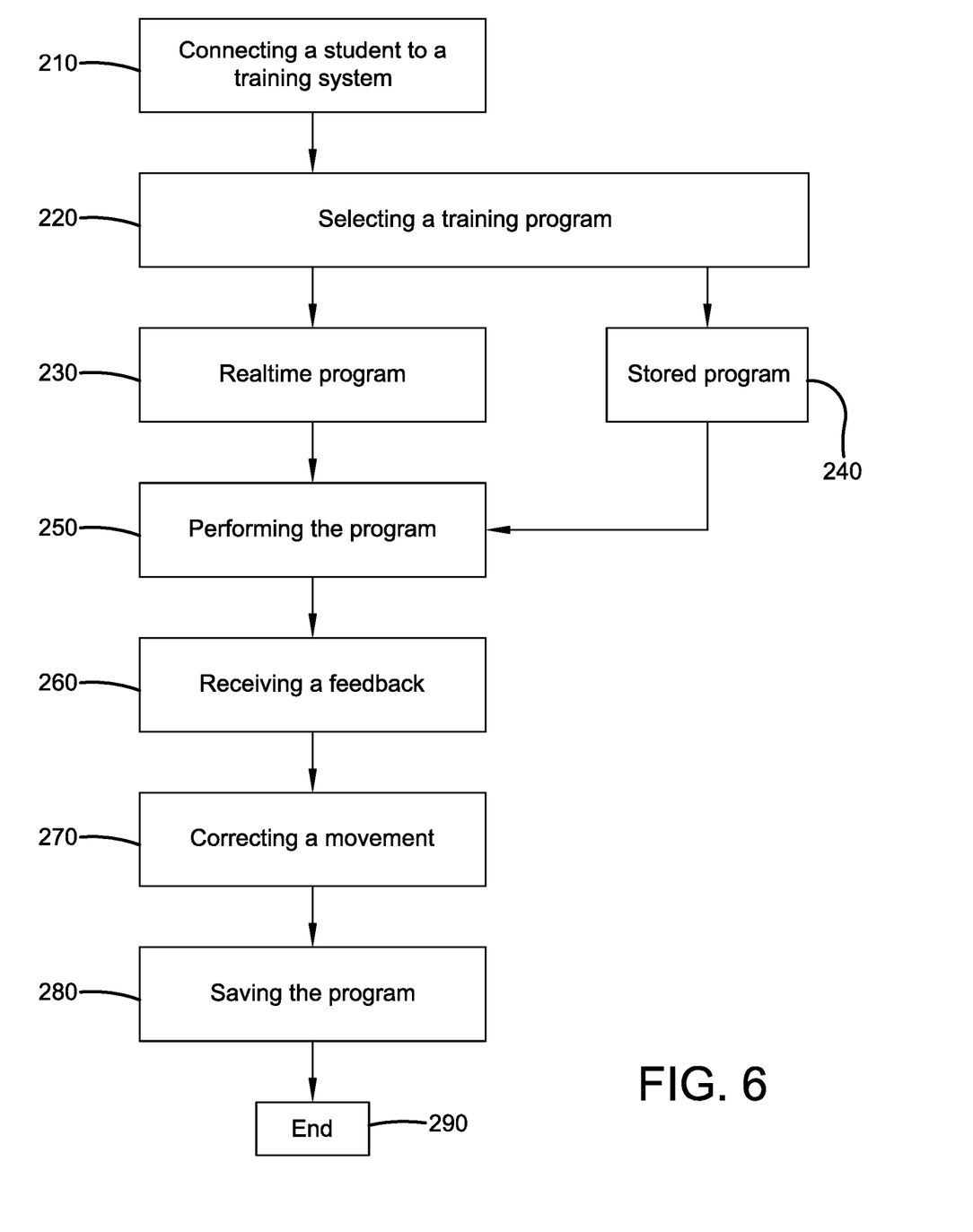
FIG. 6 illustrates flowchart of a method for connecting a student to a plurality of martial arts training programs using the martial arts training system in accordance with the disclosed architecture.

As illustrated in FIG. 6, a method of martial arts training 200 is provided. The method 200 uses the martial arts training system 100 to connect a student to an instructor remotely. The martial arts training system 100 comprises the eyewear component 132 and the user interface 102 operatively connected to the eyewear component 132. The martial arts training system 100 further comprises the server 116 comprising the server processor 118 and the server memory 120. The server memory 120 comprises the non-transitory, computer-readable medium comprising the set of executable software instructions 122. When the set of executable software instructions 122 are executed by the server processor 118, the set of executable software instructions 122 cause the server processor 118 to execute a martial arts training program that is remotely accessible by the user interface 102 and viewable via the eyewear component 132.

The server memory 120 may further comprise the database 124 for storing a plurality of training programs 126. The network 114 connects the user interface 102 to the server 116. The server 116 further comprises the feedback mechanism 128 which allows the instructor to view and correct a martial arts move in real-time. The feedback mechanism 128 is accessible via the user interface 102 for sending and receiving the feedback to and from the remote instructor.

The method 200 comprises connecting the student to the martial arts training system 100 at 210. At 220 the student selects a martial arts training program. The selected martial arts training program may be a live training program viewable in real-time at 230 or be a stored training program selected from the database 124 at 240. The student then performs the selected martial arts training program at 250. The instructor may monitor the performed training program, either in real-time or later if saved and stored, and receive a feedback from the sensors 138 and 148 from the eyewear component 132 and the at least one wearable component 140 at 260. Based on the received feedback, at 270 the instructor can correct a martial arts move which is viewable by the student via the eyewear component 132. The martial arts training program may be saved to the local memory 108 or the database 124 at 280. And the method ends at 290.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An augmented reality martial arts training system comprising:
   an eyewear component comprising a display and at least one proximity sensor configured to calculate a height, a length, a distance, and a form of a martial arts move performed by a user;
   a plurality of wearable components each comprising at least one proximity sensor configured to calculate the height, the length, the distance, and the form of the martial arts move performed by the user in conjunction with the at least one proximity sensor of the eyewear component;
   a user interface operatively connected to the eyewear component and the at least one wearable component, the user interface accessible remotely by the user and by a remote instructor in real-time and a delayed time; and
   a non-transitory, computer-readable medium comprising software instructions that, when executed by at least one processor, causes the at least one processor to execute a martial arts training program viewable on the display of the eyewear component; and
   a feedback mechanism accessible via the user interface for receiving a feedback from the remote instructor in real-time or at a delayed time based on data received from the at least one proximity sensors; and
   a plurality of pre-recorded martial arts training programs accessible by the user interface; and
   wherein the feedback is a correction of the form of the martial arts move; and
   wherein the user interface is further configured to broadcast a live martial arts training program; and
   wherein the plurality of wearable components comprise a belt, a pair of gloves, and a pair of footwear.

2. The augmented reality martial arts training system of claim 1, wherein the user interface is integrated into the at least one wearable component.

3. The augmented reality martial arts training system of claim 1, wherein the user interface comprises a memory element.

4. The augmented reality martial arts training system of claim 1, wherein the user interface is wirelessly connected to the eyewear component.

\* \* \* \* \*